United States Patent
Hirose

(10) Patent No.: US 9,488,358 B2
(45) Date of Patent: Nov. 8, 2016

(54) TEMPERATURE-CONTROLLED LASER LIGHT SOURCE DEVICE AND PROJECTOR DEVICE INCORPORATING THE LASER LIGHT SOURCE DEVICE

(71) Applicant: Mitsubishi Electric Corporation, Tokyo (JP)

(72) Inventor: Tatsuro Hirose, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 43 days.

(21) Appl. No.: 14/552,216

(22) Filed: Nov. 24, 2014

(65) Prior Publication Data

US 2015/0226417 A1 Aug. 13, 2015

(30) Foreign Application Priority Data

Feb. 7, 2014 (JP) ................. 2014-021821

(51) Int. Cl.
| | |
|---|---|
| G03B 21/16 | (2006.01) |
| F21V 29/51 | (2015.01) |
| G03B 21/20 | (2006.01) |
| F21V 29/58 | (2015.01) |
| F21V 23/00 | (2015.01) |
| H04N 9/31 | (2006.01) |
| F21Y 101/02 | (2006.01) |
| F21Y 101/00 | (2016.01) |

(52) U.S. Cl.
CPC ............. *F21V 29/51* (2015.01); *F21V 23/002* (2013.01); *F21V 29/58* (2015.01); *G03B 21/16* (2013.01); *G03B 21/2033* (2013.01); *H04N 9/3144* (2013.01); *F21Y 2101/00* (2013.01); *F21Y 2101/025* (2013.01); *F21Y 2115/30* (2016.08)

(58) Field of Classification Search
CPC ...... F21V 23/002; F21V 29/51; F21V 29/58; G03B 21/16; G03B 21/2033; H04N 9/3144; F21Y 2101/025
See application file for complete search history.

(56) References Cited

U.S. PATENT DOCUMENTS

| | | | |
|---|---|---|---|
| 2006/0029114 | A1 | 2/2006 | Kohda et al. |
| 2011/0037954 | A1* | 2/2011 | Tsuchiya ................ G03B 21/16 353/54 |
| 2011/0194578 | A1* | 8/2011 | Hirose ................ H04N 9/3161 372/36 |

FOREIGN PATENT DOCUMENTS

| | | |
|---|---|---|
| CN | 101713907 A | 5/2010 |
| CN | 101762954 A | 6/2010 |
| CN | 103513502 A | 1/2014 |
| EP | 2 256 548 A1 | 12/2010 |
| JP | 2006-253274 A | 9/2006 |
| JP | 2009-86269 A | 4/2009 |
| JP | 2009-86273 A | 4/2009 |
| JP | 2009-31430 A | 12/2009 |

\* cited by examiner

*Primary Examiner* — Sultan Chowdhury
*Assistant Examiner* — Magda Cruz
(74) *Attorney, Agent, or Firm* — Birch, Stewart, Kolasch & Birch, LLP

(57) ABSTRACT

A laser light source device includes: a laser light source module; a pipe through which a cooling refrigerant flows; a heat block which thermally joins the laser light source module and the pipe to each other; and a vessel which is arranged below the heat block and receives dew condensation water which is generated on a surface of the heat block by condensation and drops. The vessel has an opening portion which opens upward, and a plan view profile of the opening portion is larger than a plan view profile of the heat block.

9 Claims, 5 Drawing Sheets

F I G. 3
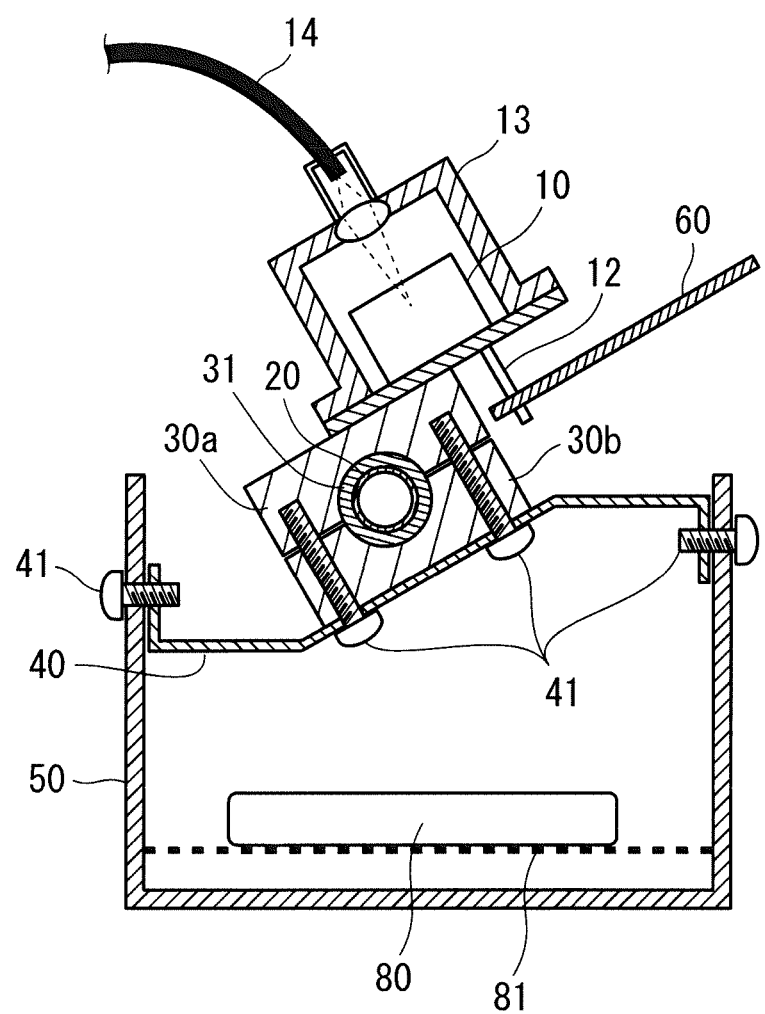

TEMPERATURE-CONTROLLED LASER LIGHT SOURCE DEVICE AND PROJECTOR DEVICE INCORPORATING THE LASER LIGHT SOURCE DEVICE

BACKGROUND OF THE INVENTION

1. Field of the Invention

The present invention relates to a light source device provided with a laser light source, and a projector device which is a projection type image display device provided with such a light source device.

2. Description of the Background Art

Recently, as a light source used in a large-sized high brightness projector device for a large hall or a digital cinema, in intermediate-sized or small-sized projector device mainly used for a conference or presentation with a small number of participants, in a projection monitor which incorporates a projection optical system and a large-sized screen in a house or the like, a light source which uses a semiconductor light source such as an LED or a laser diode has been popularly available as commercial products, and various proposals have been made concerning such a semiconductor light source. These devices can acquire the following advantageous effects by using the semiconductor light source in place of a lamp which has been conventionally used as a light source for many projector devices and projection monitors. One advantage is that these devices have a broader color reproduction range. Another advantage is that these devices can be turned on instantaneously. Still another advantage is that these devices consume a small amount of electricity. Still another advantage is that these devices have a long lifetime.

Particularly, a laser light source which uses a laser diode also has an advantage that the acquisition of higher brightness and higher output can be realized by overlapping beams. Accordingly, as one application of a large-sized high brightness projector device used for projection on a large screen, the development of the light source device provided with a large number of laser light source modules has been in progress.

In this light source device, an amount of exhaust heat from laser light source modules is increased in proportion to the increase in the number of the laser light source modules. In a large-sized high brightness projector device with several tens of thousands of lumen class, an amount of exhaust heat from the laser light source module reaches a several thousand W level. Cooling by a conventional air cooling method using a heat sink or a heat pipe unit has a significant drawback that the device becomes large-sized since it is necessary to expand a heat radiation area. Such cooling by the conventional air cooling method also has a serious drawback that a blower generates noise in acquiring a large amount of air supply.

It has been also known that a laser light source exhibits higher efficiency as a temperature of a light emitting part is lowered and hence, the laser light source can acquire higher output and a longer lifetime in such a case. On the other hand, the laser light source has a characteristic that a wavelength of the emitted light and laser output change corresponding to a change in a temperature of the light emitting part and hence, it is necessary to provide appropriate cooling which conforms to the specification of the light emitting part.

As means for solving to perform low-temperature cooling to acquire higher outputting of the laser light source, a cooling method which uses a Peltier element has been proposed. Further, it is desirable to adopt a cooling method which further increases heat radiation efficiency by directly or indirectly using a refrigerating cycle using a vapor compression refrigerating machine.

In such a cooling method, it is possible to maintain a temperature of a cooling part which is an object to be cooled at a room temperature or below. Conventionally, to prevent the generation of dew condensation water in the inside of a device during an operation, attempts have been made to maintain the temperature of the cooling part at a dew point or above. However, the increase in a light emission efficiency brought about by lowering the temperature of a light emitting part of the laser light source leads to the acquisition of long lifetime of the light source, the increase in reliability of the light source, the reduction in the number of modules and the suppression of an amount of exhaust heat and hence, the adoption of the cooling method which lowers the temperature of the cooling part equal to or below a dew point and a counter measure to prevent the generation of dew condensation water have been considered as important tasks to be developed.

For example, a technique described in Japanese Patent Application Laid-Open No. 2009-86269 is the invention relating to temperature adjustment means for laser elements arranged in an array. Japanese Patent Application Laid-Open No. 2009-86269 discloses a technique where a heat receiving plate on which the laser elements are arranged is directly brought into contact with a freezing circuit for cooling the laser elements.

For example, a technique described in Japanese Patent Application Laid-Open No. 2009-86273 is the invention for protecting a laser element array from being affected by dew condensation water. Japanese Patent Application Laid-Open No. 2009-86273 discloses a technique where outside air is shut off by forming a synthetic resin layer on a portion where the laser element array is arranged.

For example, a technique described in Japanese Patent Application Laid-Open No. 2006-253274 is the invention relating to a cooling structure of a semiconductor element such as an LED or a laser diode which uses a Peltier element. Japanese Patent Application Laid-Open No. 2006-253274 discloses the technique where dew condensation water is prevented by forming a sealed space on a side where the LED and the Peltier element are cooled in cooling the semiconductor element at a temperature equal to or below an outside air temperature.

However, the device described in Japanese Patent Application Laid-Open No. 2009-86269 takes no countermeasure against dew condensation water and hence, the device has a problem that a defect attributed to dew condensation water may arise. Further, in the device described in Japanese Patent Application Laid-Open No. 2009-86273, the synthetic resin layer formed at the portion where the laser element array is arranged is also cooled in itself and hence, the device has a problem that dew condensation water is generated on a surface of the synthetic resin layer or a problem that it is necessary to increase a thickness of the synthetic resin layer to increase heat insulation property of the synthetic resin layer so that a manufacturing cost is pushed up.

The device described in Japanese Patent Application Laid-Open No. 2006-253274 has a problem that a complicated structure becomes necessary for forming a sealed space on a cooling side of the Peltier element, and the Peltier elements, the number of which is equal to the number of light source modules, are necessary for cooling a large number of light source modules corresponding to a large output and hence, a cost of parts is increased. Further, there exists a possibility that reliability of the degree of closing is lowered caused by an error in assembling a sealed space or a slow leakage from the sealed space.

SUMMARY OF THE INVENTION

It is an object of the present invention to provide a light source device and a projector device which can prevent a defect attributed to dew condensation water generated at the time of cooling a laser light source module, and which can be manufactured at a low cost.

A light source device according to the present invention includes: a laser light source module; a pipe through which a cooling refrigerant flows; a heat block which thermally joins the laser light source module and the pipe to each other; and a vessel which is arranged below the heat block and receives dew condensation water which is generated on a surface of the heat block by condensation and drops. The vessel has an opening portion which opens upward. A plan view profile of the opening portion is larger than a plan view profile of the heat block.

The projector device according to the present invention includes: a light source device; an image light generating part which generates an image light by spatially modulating a laser beam emitted from the light source device; and a projection optical system which projects the image light.

The laser light source module is thermally joined to the pipe through the heat block. That is, the laser light source module is thermally brought into contact with a cooling refrigerant which flows through the pipe. When a temperature of a cooling refrigerant is lower than an ambient temperature around the light source device, a temperature of a joint portion between the laser light source module and the heat block is increased due to heat generated from the laser light source module. However, the transaction of heat is small on surfaces of portions of the heat block other than the joint portion. Accordingly, surface temperatures of the portions of the heat block other than the joint portion are lowered to a temperature substantially equal to a temperature of the cooling refrigerant.

When a temperature of a cooling refrigerant is lower than an ambient temperature in the inside of the light source device, surface temperatures of the portions of the heat block other than the joint portion are lowered to a temperature substantially equal to a temperature of the cooling refrigerant, and dew condensation water is generated on a surface of the heat block when the surface temperatures become lower than a dew point temperature.

The vessel provided with an opening portion having a plan view profile larger than a plan view profile of the heat block is arranged below the heat block and hence, when dew condensation water is generated on the surface of the heat block and the dew condensation water drops, it is possible to receive the dew condensation water by the vessel. Accordingly, it is possible to prevent a defect attributed to dew condensation water in the inside of the light source device. Further, the countermeasure against dew condensation water can be taken by providing the vessel which receives dew condensation water and hence, it is unnecessary for the light source device to have the complicated structure whereby a manufacturing cost of the light source device can be lowered.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a cross-sectional view of an essential part of a laser light source device according to a second preferred embodiment;

DESCRIPTION OF THE PREFERRED EMBODIMENTS

First Preferred Embodiment

Figure 1:
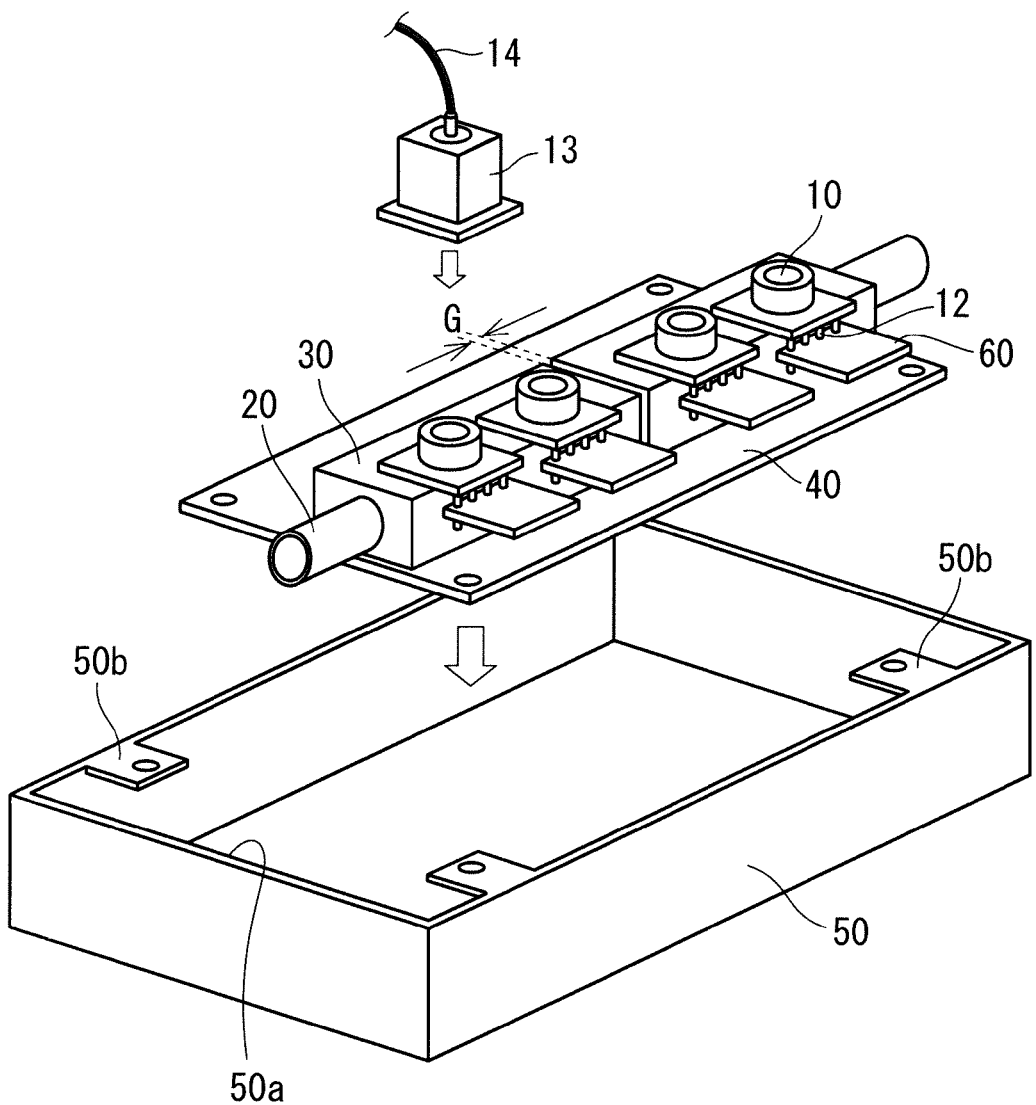
FIG. 1 is a perspective view showing a constitution of an essential part of a laser light source device according to a first preferred embodiment.

A first preferred embodiment of the present invention is described hereinafter by reference to drawings. FIG. 1 is a perspective view showing a constitution of an essential part of a laser light source device 90 according to the first preferred embodiment.

As shown in FIG. 1, the laser light source device 90 (light source device) includes: a plurality of laser light source modules 10; a pipe 20; a plurality of heat blocks 30; a holding member 40; and a vessel 50. The pipe 20 is a member through which a cooling refrigerant is made to flow.

The plurality of heat blocks 30 are members which are provided for thermally joining several sets of laser light source modules 10 which are formed by dividing the plurality of laser light source modules 10 and the pipe 20 to each other respectively. The plurality of heat blocks 30 are arranged on an upper surface of the holding member 40 (to be more specific, a center portion of the holding member 40 in the width direction) linearly in the horizontal direction with a predetermined gap G therebetween, and the pipe 20 is made to penetrate the plurality of heat blocks 30. The plurality of laser light source modules 10 divided into the respective sets are joined to upper surfaces of the respective heat blocks 30 respectively. In this manner, the plurality of laser light source modules 10 and the pipe 20 are thermally joined to each other so that the laser light source modules 10 are cooled by a cooling refrigerant which flows in the inside of the pipe 20.

An electric circuit board 60 is fixed to a side surface of the heat block 30 corresponding to each laser light source module 10 such that the electric circuit board 60 projects sideward from the heat block 30. The laser light source module 10 is electrically connected to the electric circuit board 60 through an electric terminal portion 12. When electricity is supplied to the laser light source module 10 from the electric circuit board 60 through the electric terminal portion 12, the laser light source module 10 emits a laser beam. The emitted laser beam is guided to an optical fiber 14 through an optical system unit 13.

The holding member 40 is formed into a plate shape, and has a plan view profile larger than a plan view profile of the plurality of heat blocks 30. The holding member 40 plays a role of determining the relative arrangement of the plurality of heat blocks 30 and, at the same time, plays a role of maintaining rigidity of these heat blocks 30 by receiving weights of these heat blocks 30.

Figure 4:
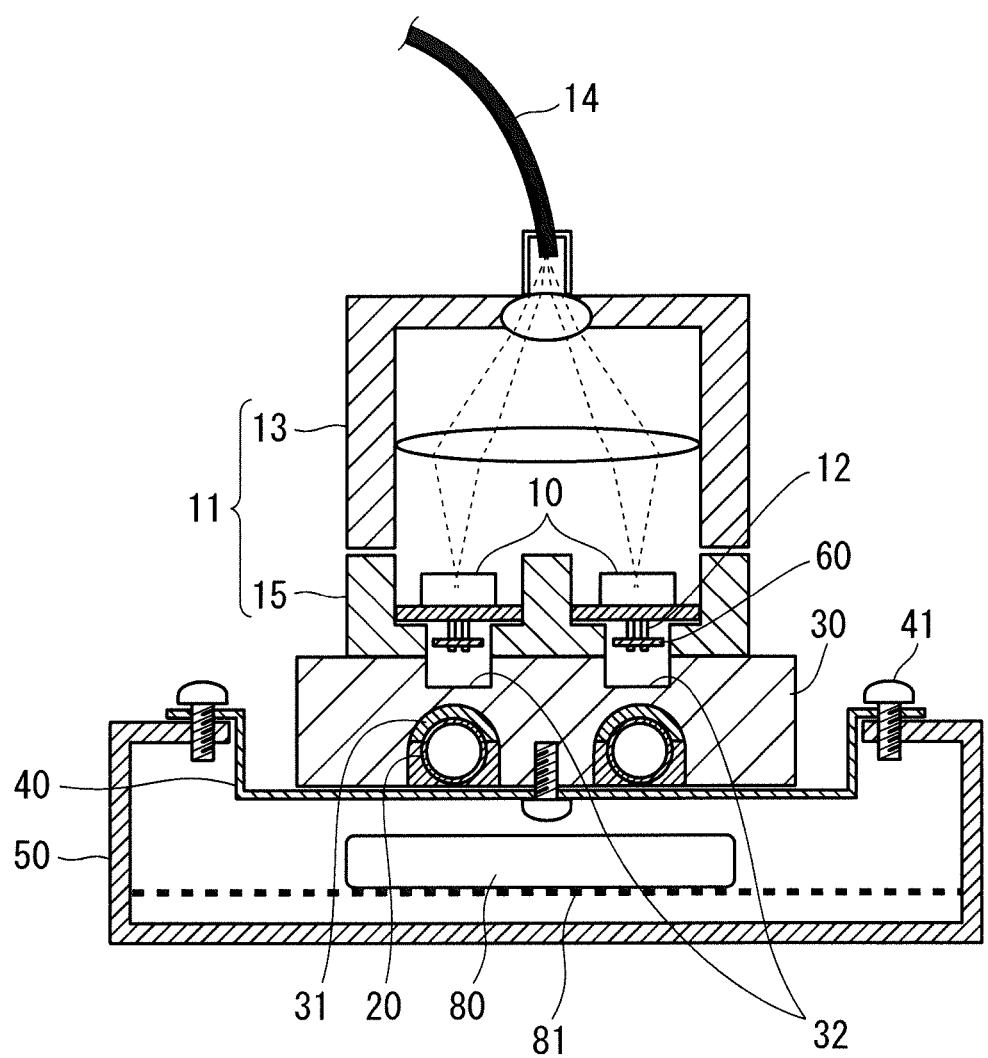
FIG. 4 is a cross-sectional view of an essential part of a laser light source device according to a third preferred embodiment.

The vessel 50 has an opening portion 50a which opens upward, and is arranged below the heat blocks 30 and the holding member 40. A plan view profile of the opening portion 50a is set larger than a plan view profile of the holding member 40. That is, the plan view profile of the opening portion 50a is larger than the plan view profile of the plurality of heat blocks 30. Mounting portions 50b which project toward the inside of the vessel 50 are provided on upper end portions of the vessel 50, and edge portions of the holding member 40 are brought into contact with the mounting portions 50b. By fixing the holding member 40 and the vessel 50 to each other using bolts 41 in a state where the edge portions of the holding member 40 are positioned at the mounting portions 50b of the vessel 50 (see FIG. 4), the vessel 50 holds the holding member 40 from below. A gap which allows dew condensation water to pass therethrough is formed between an outer peripheral portion of the holding member 40 and an upper end portion of the vessel 50. Although a constitution shown in FIG. 4 is described in a third preferred embodiment described later, the structure for fixing the holding member 40 and the vessel 50 to each other in the third preferred embodiment is equal to the structure for fixing the holding member 40 and the vessel 50 to each other in the first preferred embodiment.

Figure 2:
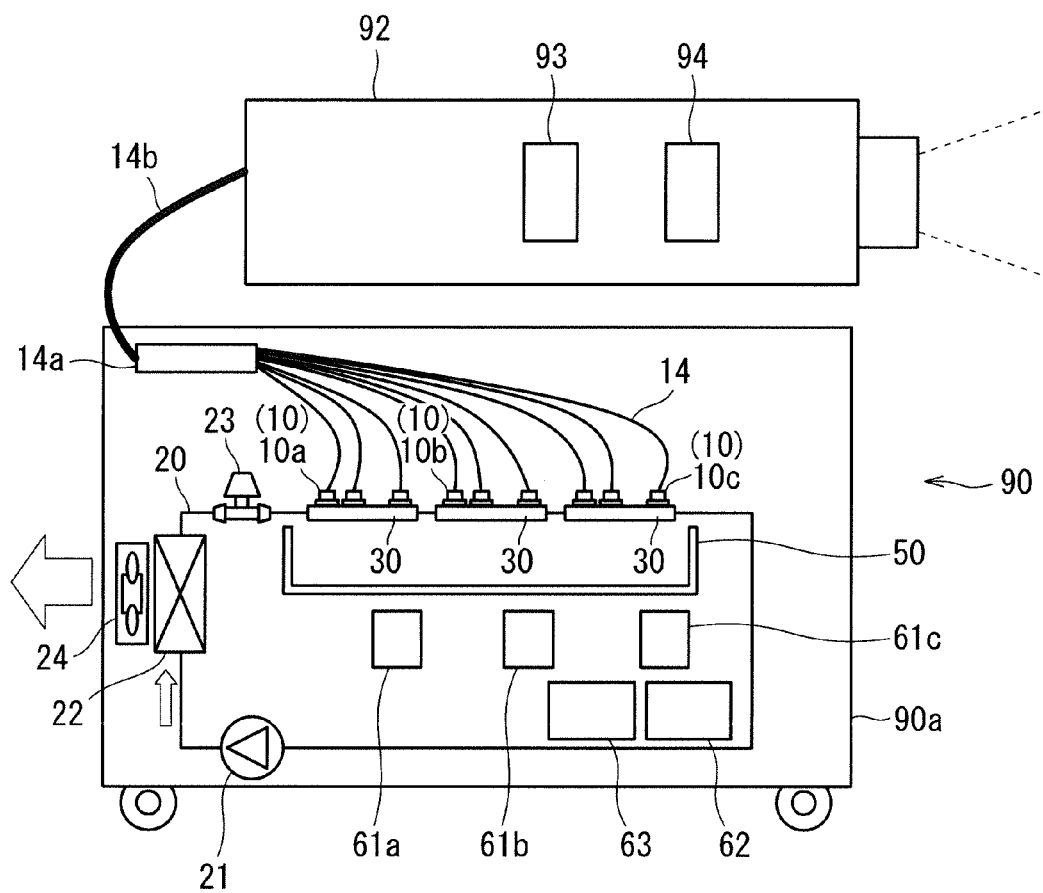
FIG. 2 is a view showing a constitution of a projector device according to the first preferred embodiment.

Next, a projector device 91 provided with the laser light source device 90 is described. FIG. 2 is a view showing a constitution of the projector device 91 according to the first preferred embodiment.

As shown in FIG. 2, the projector device 91 includes the laser light source device 90 and a projector body part 92. In this preferred embodiment, the laser light source modules 10 include green laser light source modules 10a which emit a green laser beam, red laser light source modules 10b which emit a red laser beam, and blue laser light source modules 10c which emit a blue laser beam. In the description made hereinafter, the respective modules of these three primary colors are collectively referred to as the laser light source modules 10.

The laser light source device 90 further includes: a housing 90a; laser light source drive circuit boards 61a, 61b, and 61c which drive the laser light source modules 10 of respective colors; a power source circuit board 62; and a control circuit board 63. The laser light source drive circuit boards 61a, 61b, and 61c, the power source circuit board 62 and the control circuit board 63 are arranged below the vessel 50. The above-described respective members which constitute the laser light source device 90 are arranged in the inside of the housing 90a.

The projector body part 92 includes an image light generating part 93 and a projection optical system 94. The laser light source modules 10 of the laser light source device 90 and the projector body part 92 are connected to each other using optical fibers 14, an optical fiber collecting portion 14a and an optical fiber merged wire 14b.

Laser beams emitted from the respective laser light source modules 10 are outputted to the projector body part 92 through the optical fibers 14 connected to the respective laser light source modules 10, the optical fiber collecting portion 14a and the optical fiber merged wire 14b. The image light generating part 93 generates an image light by spatially modulating the laser beams outputted from the laser light source device 90. The projection optical system 94 projects the image light generated by the image light generating part 93 to the outside.

The laser light source device 90 further includes, in the inside of the housing 90a: a compressor 21; a condenser 22; and an expansion valve 23 which are connected to the pipe 20 in a ring shape and form a refrigerant circuit. The laser light source device 90 further includes a fan 24 for supplying air to the condenser 22. A cooling refrigerant of high temperature and high pressure compressed by the compressor 21 which constitutes a vapor compressor is subjected to a heat exchange between the condenser 22 and outside air which is ventilated by an action of the fan 24 so that a temperature of the cooling refrigerant is lowered thus becoming a cooling refrigerant of low temperature and high pressure. At the same time, condensation heat of the refrigerant is discharged to the outside of the housing 90a by the fan 24.

Next, the cooling refrigerant takes away evaporation latent heat at the time of passing through the pipe 20 thermally joined to the laser light source modules 10 after a pressure of the cooling refrigerant is reduced by the expansion valve 23 so that the cooling refrigerant becomes a cooling refrigerant of low temperature and low pressure while absorbing heat. Due to this series of operations, that is, a so-called heat pump operation, the laser light source modules 10 continuously discharge heat generated by the laser light source modules 10 per se to the outside of the housing 90a thus maintaining a temperature of the laser light source modules 10 at a fixed temperature.

By the action of the refrigerant circuit, a temperature of a refrigerant in the inside of the pipe 20 which is thermally joined to the heat blocks 30 shown in FIG. 1 is lowered to a temperature below an ambient temperature around the heat blocks 30. A temperature at the joint portions between the laser light source modules 10 and the heat blocks 30 is increased due to heat generated from the laser light source modules 10. However, the transaction of heat is small on surfaces of portions of the heat block 30 other than the joint portion and hence, surface temperatures of the portions of the heat block 30 other than the joint portion are lowered to a temperature substantially equal to a temperature of the cooling refrigerant. Dew condensation water is generated on the surface of the heat block 30 when the reached surface temperature becomes lower than a dew point of ambient air. When outside air which contains vapor is continuously supplied to the ambient air, a condensation state is maintained so that water droplets (dew condensation water) generated on the surface of the heat block 30 are merged/collected and, then, flow downward and drop due to their own weights.

In the laser light source device 90 according to the first preferred embodiment, the vessel 50 is arranged below the heat blocks 30 and hence, it is possible to store the generated dew condensation water without leakage of dew condensation water. Due to such a constitution, there is no possibility that dew condensation water intrudes into the laser light source drive circuit boards 61a, 61b, and 61c, the power source circuit board 62 and the control circuit board 63 and hence, the short-circuiting of these circuit boards can be prevented whereby the safety of the laser light source device 90 can be enhanced.

At the same time, the water leakage to the outside of the laser light source device 90 can be also prevented so that it is possible to prevent facilities and assets of a user from being wetted with water.

By lowering a temperature of the cooling refrigerant to a temperature equal to or below an ambient temperature in the inside of the housing 90a, it is possible to maintain a temperature of the laser light source modules 10 at a lower temperature. A laser diode arranged in the inside of the laser light source module 10 has a characteristic that the lower a temperature of a light emitting part of the laser diode, the longer a lifetime of the laser diode becomes. Accordingly, the laser light source module 10 can further enhance reliability in the laser light source device 90.

The laser diode also has a characteristic that electro-optical conversion efficiency is increased as the temperature of the light emitting part is lowered. Accordingly, by lowering a temperature of the cooling refrigerant, an optical output of the laser light source device 90 to the outside is increased. Eventually, it is also possible to reduce the number of laser light source modules 10 necessary for acquiring an optical output which the laser light source device 90 requires and hence, a manufacturing cost of the laser light source device 90 can be lowered.

As a material for forming the heat block 30, the use of an aluminum alloy such as A1100 or A6063 is considered. from a viewpoint of heat conductivity, a cost and a weight, When the number of laser light source modules 10 is increased so that a length of the pipe 20 is increased, a length of the heat block 30 is also increased. However, by dividing the heat block 30 into a plurality of heat blocks 30 as shown in FIG. 1, it is possible to acquire an advantageous effect that the handling of the heat blocks 30 is facilitated so that the assembling property of the heat blocks 30 is enhanced. Further, in the case where the laser light source modules 10 are manufactured using an extrusion mold which requires the small number of post-working steps to manufacture parts at a low cost, it is possible to acquire an advantageous effect that an error in size of the heat block 30 caused by warping or the like can be decreased by shortening the length of the heat block 30.

On the other hand, in general, a case is considered where the pipe 20 is formed using a copper pipe made of C1220 from a viewpoint of heat conductivity and workability of a joint portion. Also in such a case where a material for forming the pipe 20 and a material for forming the heat block 30 differ from each other, by providing a gap G between the heat blocks 30 arranged adjacent to each other, it is possible to avoid the collision of the heat blocks 30 caused by the difference in thermal expansion ratio. That is, by providing the gap G between the heat blocks 30, the generation of a stress at the joint portion between the pipe 20 and the heat block 30 due to a thermal strain can be avoided so that it is possible to provide the highly reliable heat radiation structure where the joint portion is not peeled off and a contact failure does not occur even in a cycle where an operation and a non-operation are repeated over a long period. Accordingly, it is also possible to acquire an advantageous effect that the reliability of the laser light source modules 10 is enhanced.

As has been explained heretofore, in the laser light source device 90 and the projector device 91 according to the first preferred embodiment, the laser light source modules 10 are thermally joined to the pipe 20 through the heat blocks 30. That is, the laser light source modules 10 are thermally joined to a cooling refrigerant which flows through the pipe 20. When a temperature of a cooling refrigerant is lower than an ambient temperature around the pipe 20, although a temperature of the joint portion between the laser light source module 10 and the heat block 30 is increased due to heat generated from the laser light source module 10, the transaction of heat is small on the surfaces of the portions of the heat block 30 other than the joint portion. Accordingly, surface temperatures of the portions of the heat block 30 other than the joint portion are lowered to a temperature substantially equal to a temperature of the cooling refrigerant.

When a temperature of a cooling refrigerant is lower than an ambient temperature in the inside of the housing 90a of the laser light source device 90, surface temperatures of the portions of the heat block 30 other than the joint portion are lowered to a temperature substantially equal to a temperature of the cooling refrigerant, and dew condensation water is generated on the surface of the heat block 30 when the surface temperatures become lower than a dew point temperature.

By arranging the vessel 50 provided with the opening portion 50a having the plan view profile larger than the plan view profile of the heat block 30 below the heat block 30, when dew condensation water is generated on the surface of the heat block 30 and the dew condensation water drops, the vessel 50 can receive the dew condensation water. Accordingly, in the inside of the housing 90a of the laser light source device 90, it is possible to prevent a defect attributed to dew condensation water. Further, the countermeasure against dew condensation water can be taken by providing the vessel 50 which receives dew condensation water and hence, it is unnecessary for the light source device to have the complicated structure whereby a manufacturing cost of the laser light source device 90 can be lowered.

The projector device 91 includes: the laser light source device 90; the image light generating part 93 which generates an image light by spatially modulating a laser beam emitted from the laser light source device 90; and the projection optical system 94 which projects an image light. Accordingly, a defect attributed to dew condensation water can be prevented, and a manufacturing cost of the projector device 91 can be lowered.

The laser light source device 90 includes the plurality of laser light source modules 10 and the plurality of heat blocks 30, the plurality of heat blocks 30 respectively thermally join respective sets of laser light source modules 10 formed by dividing the plurality of laser light source modules 10 and the pipe 20 to each other. The laser light source device 90 further includes the holding member 40 which fixes and holds the plurality of heat blocks 30 thereon, and has a plan view profile larger than a plan view profile of the plurality of heat blocks 30. Accordingly, the structure for holding the plurality of heat blocks 30 can be simplified so that a manufacturing cost of the laser light source device 90 can be lowered.

The vessel 50 is arranged below the holding member 40, and the plan view profile of the opening portion 50a is larger than a plan view profile of the holding member 40. Accordingly, dew condensation water generated on the plurality of heat blocks 30 can be received by the vessel 50 through the holding member 40. Due to such a constitution, even when the laser light source 90 device includes the plurality of laser light source modules 10 and the plurality of heat blocks 30, a defect attributed to dew condensation water in the inside of the housing 90a of the laser light source device 90 can be prevented and, at the same time, a manufacturing cost of the laser light source device 90 can be lowered.

The plurality of heat blocks 30 are arranged adjacent to each other with a predetermined gap G therebetween. Accordingly, even when thermal strain is generated due to the difference in a thermal expansion ratio between the pipe 20 and the heat block 30, a stress generated at the joint portion between the pipe 20 and the heat block 30 is alleviated so that it is possible to prevent the peeling and a contact failure of the joint portion after the laser light source device 90 is repeatedly used over a long time. By prolonging a lifetime of the heat radiation structure, temperatures of the laser light source modules 10 can be maintained at a fixed temperature and hence, a reliability of the laser light source device 90 can be enhanced.

The first preferred embodiment exemplifies the optical transmission connection where the laser light source device 90 is connected to the projector body part 92 which is a housing separate from the laser light source device 90 using the optical fibers 14. However, the laser light source device 90 and the projector body part 92 may be arranged in the same housing. Further, the optical transmission connection may be performed using a spatial synthetic optical system.

Further, the first preferred embodiment exemplifies the constitution where cooling refrigerant which change a phase by compression is made to directly flow in the inside of the pipe 20 in the refrigerant circuit including the compressor 21 which is a vapor compressor. However, it may be possible to adopt the constitution where cold water is produced using a vapor compression refrigerating machine, and the produced cold water is made to flow in the inside of the pipe 20.

The laser light source device may be constituted of one laser light source module 10. In such a case, one laser light source module 10 is fixed to an upper surface of one heat block 30. In this case, the holding member 40 can be omitted and hence, a plan view profile of the opening portion 50a of the vessel 50 is set larger than a plan view profile of the heat block 30. To be more specific, it is sufficient that the opening portion 50a of the vessel 50 has a size that at least edge portions of the heat block 30 can be brought into contact with the mounting portions 50b of the vessel 50.

Second Preferred Embodiment

Next, a laser light source device 90A according to a second preferred embodiment is described. FIG. 3 is a cross-sectional view of an essential part of the laser light source device 90A according to the second preferred embodiment. In the second preferred embodiment, constitutional elements identical with the corresponding constitutional elements described in the first preferred embodiment are given the same symbols, and the explanation of such elements is omitted.

In the second preferred embodiment, a heat block 30 is divided in two in the vertical direction. That is, the heat block 30 is constituted of an upper portion 30a and a lower portion 30b. Further, a portion of a holding member 40 where the heat block 30 is arranged (that is, a center portion of the holding member 40 in the width direction) is formed into an inclined surface which is inclined such that one side of the holding member 40 in the width direction is disposed at a higher position than the other side of the holding member 40 in the width direction. Accordingly, the heat block 30 and a laser light source module 10 are arranged in an inclined manner, and an electric terminal portion 12 is arranged above the heat block 30.

A pipe 20 is sandwiched between the upper portion 30a of the heat block 30 and the lower portion 30b of the heat block 30, and a thermal bonding material 31 made of a solder, a silicone resin, an epoxy resin or the like is filled in a space defined between the heat block 30 and the pipe 20.

The upper portion 30a of the heat block 30 and the lower portion 30b of the heat block 30 are fixed to the holding member 40 from below using bolts 41. An edge portion of the holding member 40 which is positioned on a lower side is bent upward, and an edge portion of the holding member 40 which is positioned on an upper side is bent downward.

The holding member 40 and a vessel 50 are fixed to each other using the bolts 41 in a state where the edge portions of the holding member 40 are positioned on inner surfaces of side portions of the vessel 50 so that the vessel 50 holds the holding member 40 from below.

The portion of the holding member 40 where the heat block 30 is arranged is inclined such that the electric terminal portion 12 is always arranged above the heat block 30. Accordingly, when water droplets generated on a surface of the heat block 30 is dropped in the direction of gravity, there is no possibility that the water droplets pass the electric terminal portion 12 and hence, the short-circuiting of the electric terminal portion 12 can be prevented whereby the safety of the laser light source device 90A can be increased.

Further, a mesh 81 is arranged at a peripheral portion of a bottom portion of the vessel 50, and a desiccant 80 which contains silica gel as a main component is arranged on an upper surface of the mesh 81.

As has been described above, in the laser light source device 90A and a projector device 91 according to the second preferred embodiment, the laser light source device 90A further includes the electric terminal portion 12 for supplying electricity to the laser light source modules 10, and the electric terminal portion 12 is arranged above the heat block 30. Accordingly, it is possible to prevent water droplets generated on the surface of the heat block 30 from dropping on the electric terminal portion 12 so that the short-circuiting of the electric terminal portion 12 can be prevented. Accordingly, the safety of the laser light source device 90A is increased.

The laser light source device 90A further includes the desiccant 80 arranged in the inside of the vessel 50. Due to such arrangement of the desiccant 80, the desiccant 80 absorbs vapor around the laser light source module 10 and the heat block 30 so that relative humidity can be suppressed to a low level thus lowering a dew point whereby dew condensation water is minimally generated on the surface of the heat block 30 by condensation. Accordingly, a temperature of a cooling refrigerant can be further lowered and hence, a reliability of the laser light source module 10 is enhanced and a manufacturing cost can be lowered. The desiccant 80 may be replaced with a dehumidifier which contains calcium carbonate or calcium chloride as a main component. Also in such a case, the substantially same advantageous effects can be acquired.

Third Preferred Embodiment

Next, a laser light source device 90B according to a third preferred embodiment is described. FIG. 4 is a cross-sectional view of an essential part of the laser light source device 90B according to the third preferred embodiment. In the third preferred embodiment, constitutional elements identical with the corresponding constitutional elements described in the first preferred embodiment and the second preferred embodiment are given the same symbols, and the explanation of such elements is omitted.

In the third preferred embodiment, the laser light source device 90B includes a laser light source cluster 11 where a plurality of laser light source modules 10 are arranged.

The laser light source cluster 11 includes a laser light source cluster base 15 on which the plurality of laser light source modules 10 are arranged, and an optical system unit 13. The laser light source cluster 11 condenses a plurality of emitted laser beams to the optical fiber 14. By clustering the laser light source modules 10, it is possible to reduce the number of optical fibers 14.

Further, the laser light source cluster base 15 is thermally joined to a heat block 30 so that temperatures of the plurality of laser light source modules 10 are maintained at a fixed temperature. Groove portions 32 are formed in the heat block 30 at peripheral portions of the respective joint portions between the heat block 30 and the laser light source modules 10 (that is, portions of the heat block 30 above a pipe 20). To be more specific, an electric circuit board 60 is arranged on a lower surface of each laser light source module 10 by way of an electric terminal portion 12, and each groove portion 32 is formed in the heat block 30 at a position below the electric terminal portion 12 in the vertical direction. In other words, the electric terminal portions 12 are arranged above the groove portions 32 in the vertical direction.

A holding member 40 is formed such that edge portions of the holding member 40 in the width direction are bent in an L shape respectively, and the edge portions of the holding member 40 are arranged at positions higher than a center portion of the holding member 40 in the width direction. In the same manner as the first preferred embodiment, the holding member 40 and a vessel 50 are fixed using bolts 41 such that the vessel 50 holds the holding member 40 from below.

As described above, in the laser light source device 90B and a projector device 91 according to the third preferred embodiment, the laser light source device 90B further includes the electric terminal portions 12 for supplying electricity to the laser light source modules 10, the heat block 30 has the groove portions 32 formed in the peripheral portions of the joint portions with the laser light source modules 10, and the electric terminal portions 12 are arranged above the groove portions 32. Due to such a constitution, it is possible to prevent water droplets generated on the surface of the heat block 30 from dropping on the electric terminal portion 12 and hence, the short-circuiting of the electric terminal portion 12 can be prevented. Accordingly, the safety of the laser light source device 90B can be enhanced.

Further, the groove portions 32 are formed in the peripheral portions of the joint portions of the heat block 30 with the plurality of laser light source modules 10 so that a distance between the laser light source module 10 and the pipe 20 can be decreased. That is, a distance between the laser light source module 10 and the cooling refrigerant can be decreased and hence, a thermal resistance can be suppressed to a low level. By maintaining a temperature of the laser light source modules 10 at a lower temperature, a lifetime of the laser light source module 10 can be prolonged so that a reliability of the laser light source module 10 can be enhanced. Further, the number of laser light source modules 10 can be reduced and hence, a manufacturing cost of the laser light source device 90B can be lowered.

Fourth Preferred Embodiment

Figure 5:
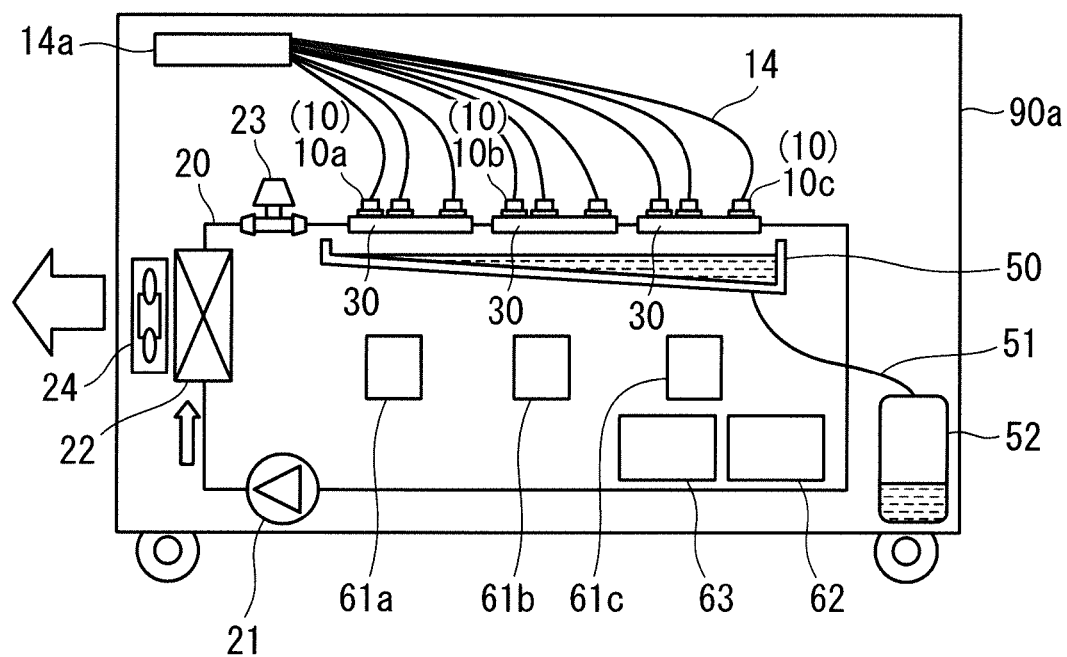
FIG. 5 is a view showing a constitution of a laser light source device according to a fourth preferred embodiment.

Next, a laser light source device 90C according to a fourth preferred embodiment is described. FIG. 5 is a view showing a constitution of the laser light source device 90C according to the fourth preferred embodiment. In the fourth preferred embodiment, constitutional elements identical with the corresponding constitutional elements described in the first to third preferred embodiments are given the same symbols, and the explanation of such elements is omitted.

In the fourth preferred embodiment, one end of a drain pipe 51 is connected to a portion of a bottom surface of a vessel 50. The other end of the drain pipe 51 is connected to a tank 52 arranged in the inside of a housing 90a. The bottom surface of the vessel 50 is formed in an inclined manner. To be more specific, the bottom surface of the vessel 50 is inclined such that a side of the bottom surface of the vessel 50 to which the drain pipe 51 is connected becomes lower than the other side of the bottom surface of the vessel 50. The bottom surface of the vessel 50 is formed in an inclined manner and hence, dew condensation water which drops in the inside of the vessel 50 is stored in the tank 52 through the drain pipe 51.

As has been described above, in the laser light source device 90C and a projector device 91 described in the fourth preferred embodiment, the laser light source device 90C further includes the drain pipe 51 which is connected to the vessel 50 and discharges dew condensation water in the vessel 50 to the outside. Accordingly, the dew condensation water received by the vessel 50 can be continuously discharged to the outside. Due to such a constitution, it is unnecessary for a user to manually discharge dew condensation water in the inside of the vessel 50 periodically and hence, the maintenance property of the laser light source device 90C is enhanced. Further, it is unnecessary to store dew condensation water in the inside of the vessel 50 and hence, it is possible to reduce a volume of the vessel 50.

Further, the laser light source device 90C includes the tank 52 and hence, an amount of dew condensation water which can be stored in the inside of the laser light source device 90C can be increased with the simple structure. Further, an amount of water in the inside of the laser light source device 90C can be grasped and discharged at the time of inspection and exchange performed periodically and hence, maintenance property of the laser light source device 90C is enhanced.

The drain pipe 51 may be connected to drainage equipment arranged outside the housing 90a. By adopting such a constitution, water-draining is continuously performed and hence, maintenance of water-draining is unnecessary whereby maintenance property of the laser light source device 90C can be further enhanced.

Next, the industrial applicability of the present invention is described. The laser light source devices 90, 90A, 90B, and 90C are effectively applicable to the case where the laser light source devices 90, 90A, 90B, and 90C are used as laser light sources for a projector device and hence, the laser light source devices 90, 90A, 90B, and 90C are cooled to a temperature lower than an ambient temperature. The laser light source devices 90, 90A, 90B, and 90C are preferably applicable to an image display device or the like which includes a semiconductor element having a large heat value.

While the invention has been shown and described in detail, the foregoing description is in all aspects illustrative and not restrictive. It is therefore understood that numerous modifications and variations can be devised without departing from the scope of the invention.

What is claimed is:

1. A light source device comprising:
   a laser light source module;
   a pipe through which a cooling refrigerant flows;
   a heat block which thermally joins said laser light source module and said pipe to each other; and
   a vessel which is arranged below said heat block and receives dew condensation water which is generated on a surface of said heat block by condensation and drops, wherein
   said vessel has an opening portion which opens upward, and a plan view profile of said opening portion is larger than a plan view profile of said heat block.

2. The light source device according to claim 1, further comprising:
a plurality of said laser light source modules; and
a plurality of said heat blocks, wherein
said plurality of heat blocks respectively thermally join respective sets of laser light source modules formed by dividing said plurality of laser light source modules and said pipe to each other,
said light source device further comprising
a holding member which fixes and holds said plurality of heat blocks thereon, and has a plan view profile larger than a plan view profile of said plurality of heat blocks.

3. The light source device according to claim 2, wherein
said vessel is arranged below said holding member, and the plan view profile of said opening portion is larger than the plan view profile of said holding member.

4. The light source device according to claim 2, wherein
said plurality of heat blocks are arranged adjacent to each other with a predetermined gap therebetween.

5. The light source device according to claim 1, further comprising:
an electric terminal portion for supplying electricity to said laser light source module,
wherein said electric terminal portion is arranged above said heat block.

6. The light source device according to claim 1, further comprising:
an electric terminal portion for supplying electricity to said laser light source module,
wherein said heat block has a groove portion formed in a peripheral portion of a joint portion with said laser light source module, and
said electric terminal portion is arranged above said groove portion.

7. The light source device according to claim 1, further comprising:
a drain pipe which is connected to said vessel and discharges dew condensation water in said vessel to an outside.

8. The light source device according to claim 1, further comprising:
a desiccant arranged in an inside of said vessel.

9. A projector device comprising:
said light source device according to claim 1;
an image light generating part which generates an image light by spatially modulating a laser beam emitted from said light source device; and
a projection optical system which projects said image light.

* * * * *